United States Patent
Zhou

(10) Patent No.: US 10,658,845 B2
(45) Date of Patent: May 19, 2020

(54) METHOD AND SYSTEM FOR DROOP CONTROL OF POWER SYSTEMS

(71) Applicant: GE Energy Power Conversion Technology Limited, Rugby, Warwickshire (GB)

(72) Inventor: Zhi Zhou, Selkirk, NY (US)

(73) Assignee: GE ENERGY POWER CONVERSION TECHNOLOGY LIMITED, Warwickshire (GB)

(*) Notice: Subject to any disclaimer, the term of this patent is extended or adjusted under 35 U.S.C. 154(b) by 136 days.

(21) Appl. No.: 15/838,101

(22) Filed: Dec. 11, 2017

(65) Prior Publication Data

US 2019/0181648 A1 Jun. 13, 2019

(51) Int. Cl.
| | |
|---|---|
| *G05B 15/02* | (2006.01) |
| *H02J 4/00* | (2006.01) |
| *H02J 3/28* | (2006.01) |
| *H02J 3/38* | (2006.01) |
| *H02J 3/32* | (2006.01) |
| *G05B 19/042* | (2006.01) |

(52) U.S. Cl.
CPC .............. *H02J 4/00* (2013.01); *G05B 19/042* (2013.01); *H02J 3/28* (2013.01); *H02J 3/32* (2013.01); *H02J 3/381* (2013.01); *G05B 2219/2639* (2013.01)

(58) Field of Classification Search
CPC ...... H02J 3/38; H02J 3/381; H02J 1/14; H02J 3/16; H02J 3/24; H02J 3/46; H02J 1/10; H02J 1/12; H02J 3/14; Y02E 10/563; Y02E 40/18; Y02E 40/30; Y02E 40/34; Y04S 10/123; G05B 19/042; G05B 2219/2619; G05B 2219/2639
See application file for complete search history.

(56) References Cited

U.S. PATENT DOCUMENTS

| | | | | |
|---|---|---|---|---|
| 7,158,395 | B2* | 1/2007 | Deng | ........................ G05F 1/67 |
| | | | | 363/95 |
| 9,042,141 | B2* | 5/2015 | Yu | ........................ H02M 7/537 |
| | | | | 323/282 |
| 9,634,510 | B2* | 4/2017 | Choi | ....................... H02J 7/007 |
| 10,116,136 | B2* | 10/2018 | McCullough | ............. H02J 3/14 |

(Continued)

OTHER PUBLICATIONS

Marroyo et al. (State-of-charge-based droop control for stand-alone AC supply systems with distributed energy storage) (Year: 2015).*

(Continued)

*Primary Examiner* — Darrin D Dunn
(74) *Attorney, Agent, or Firm* — Wood IP LLC

(57) ABSTRACT

There is provided a system that includes a processor. The system also includes a memory that stores instructions; when executed by the processor, the instructions configure the processor to perform certain operations. The operations include receiving sensor measurements from an electric power source or device and generating, based on the sensor measurements, a droop control procedure that includes a droop control curve having a non-constant slope. The operations further include regulating a power delivery from the electric power source or device to a bus according to the droop control procedure.

20 Claims, 12 Drawing Sheets

(56) References Cited

U.S. PATENT DOCUMENTS

| | | | |
|---|---|---|---|
| 2014/0218985 A1* | 8/2014 | Yu | H02M 7/537 |
| | | | 363/97 |
| 2014/0316604 A1* | 10/2014 | Ortjohann | H02J 3/381 |
| | | | 700/298 |
| 2015/0046721 A1* | 2/2015 | Drake | G06F 1/08 |
| | | | 713/300 |
| 2015/0214754 A1* | 7/2015 | Choi | H02J 7/007 |
| | | | 320/134 |
| 2015/0311716 A1* | 10/2015 | He | H02J 3/16 |
| | | | 700/287 |
| 2016/0149419 A1* | 5/2016 | Gersch | H02J 7/0013 |
| | | | 320/107 |
| 2016/0306372 A1* | 10/2016 | Holveck | G05F 1/625 |
| 2017/0110880 A1* | 4/2017 | Chen | H02M 7/493 |
| 2017/0133849 A1* | 5/2017 | Feng | G05F 1/70 |
| 2017/0194792 A1* | 7/2017 | Zimmanck | H02J 3/383 |
| 2017/0214243 A1* | 7/2017 | Rancuret | H02J 3/28 |
| 2017/0235322 A1* | 8/2017 | Rahmani | G05F 1/66 |
| | | | 700/295 |
| 2018/0198276 A1* | 7/2018 | Zubieta | G05F 1/12 |
| 2018/0366948 A1* | 12/2018 | Lehn | H02J 1/14 |
| 2019/0181643 A1* | 6/2019 | Chae | H02J 3/32 |

OTHER PUBLICATIONS

Wong et al., Control of Island AC Microgrids Using a Fully Distributed Approach, IEEE (Year: 2015).*

Choo et al., Distributed Control for Autonomous Operation of a Three-Port AC/DC/DS Hybrid Micrrogrid, IEEE (Year: 2015).*

* cited by examiner (PRIOR ART)

(PRIOR ART)

METHOD AND SYSTEM FOR DROOP CONTROL OF POWER SYSTEMS

GOVERNMENT LICENSE RIGHTS

This invention was made with government support under contract number N00014-14-C-0103 awarded by the Department of Defense (DOD). The government has certain rights in this invention.

FIELD OF INVENTION

The present disclosure relates power delivery from one or more power sources or devices. More particularly, the present disclosure relates to performing droop control of one or more power sources or devices such as generators or energy storage modules.

BACKGROUND OF THE INVENTION

New electric power systems may include multiple-function energy storage elements. For example, in one instance, an energy storage element may be used as a generation source in order to mitigate transients in the system. In another instance, the energy storage element may be used as a backup device to provide power in case main generation sources fail.

Traditional droop control procedures for power systems typically follow a fixed-slope control line. However, in new electric power systems, as the capacity (e.g., the state of charge) of an energy storage element changes, the fixed slope linear droop control will degrade to a point that may cause instability in the electric power system. To avoid this, a centralized control scheme may be employed. This approach, however, increases the complexity and cost of such electric power systems, and the electric power system's reliability may be comprised when the centralized control system fails.

SUMMARY OF INVENTION

The embodiments featured herein help solve or mitigate the above-mentioned issues and others know in the art. For example, one embodiment features a system that includes a processor. The system also includes a memory that stores instructions; when executed by the processor, the instructions configure the processor to perform certain operations. The operations include receiving sensor measurements from a power source or device such as an electric generator or energy storage device, and generating based on the sensor measurements, a droop control procedure that includes a droop control curve having a non-constant slope. The operations further include regulating a power delivery from the power source or device to a bus according to the droop control procedure.

Another embodiment features a system that includes a processor. The system also includes a memory that stores instructions which, when executed by the processor, configure the processor to perform certain operations. The operations include receiving sensor measurements from an electric generator or energy storage device and generating, based on the sensor measurements, a droop control procedure that includes a droop control range delimited by two distinct droop control curves. The operations further include regulating a power delivery from the power source or device to a bus according to the droop control procedure.

Another embodiment features a method that includes receiving, by a processor coupled to a power source or device, sensor measurements indicative of a state of the power source or device. The method further includes generating, based on the sensor measurements, a droop control procedure including a droop control curve having a non-constant slope. The method further includes regulating a power delivery from the power source or device to a bus according to the droop control procedure.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
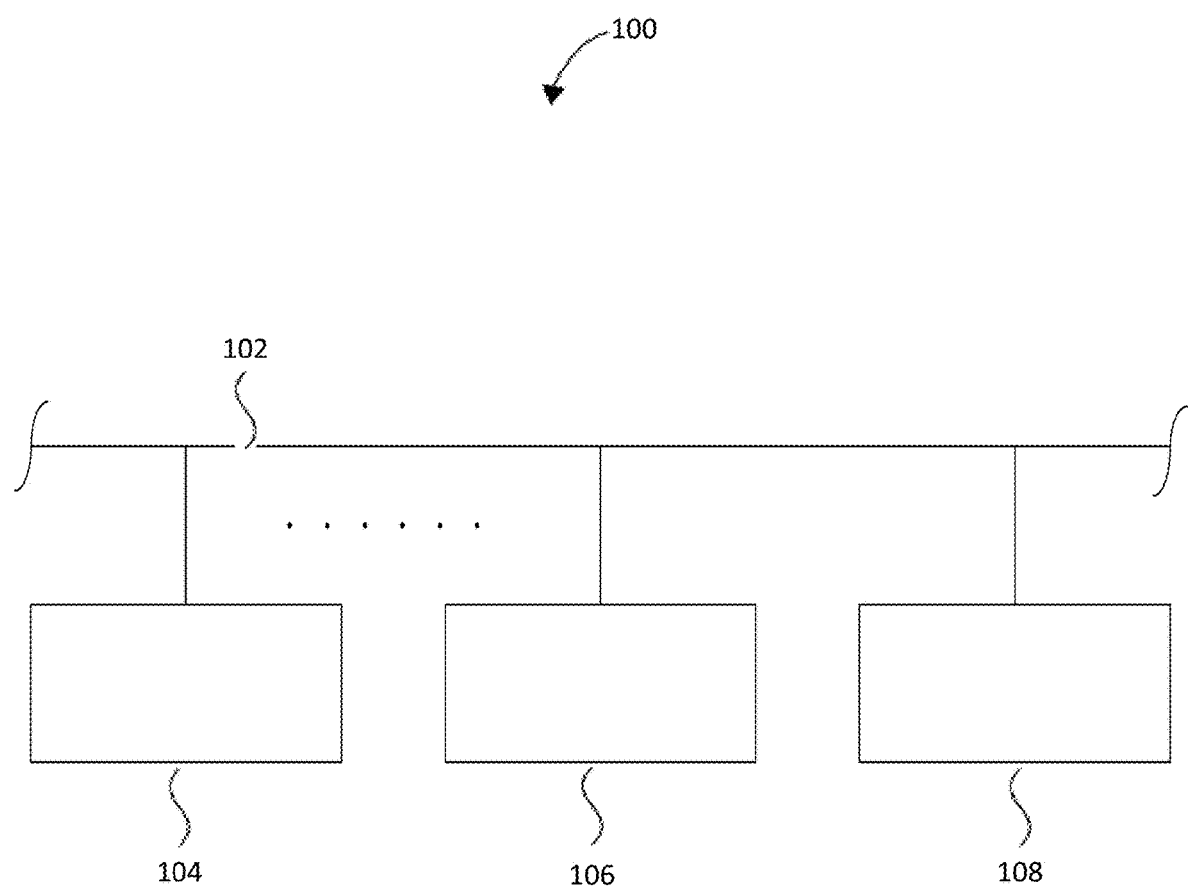
FIG. 1 illustrates a section of an electric power system in accordance with several aspects described herein.

FIG. 1 illustrates a section of an electric power system 100 that includes a set of power sources or devices connected to a power delivery bus 102 at which end there may be a load that draws the power delivered to the bus to perform one or more functions. The electric power system 100 is an alternating current (AC) electric power system. The set of power sources or devices may include one or more electric generators that are connected to the power bus 102. For example, there may be a power source or device 104, a power source or device 106, and a power source or device 108 that are each connected to the power delivery bus 102. In one example, each one of the electric power sources or devices may be a rotating generation asset, such as a generator.

Figure 2:
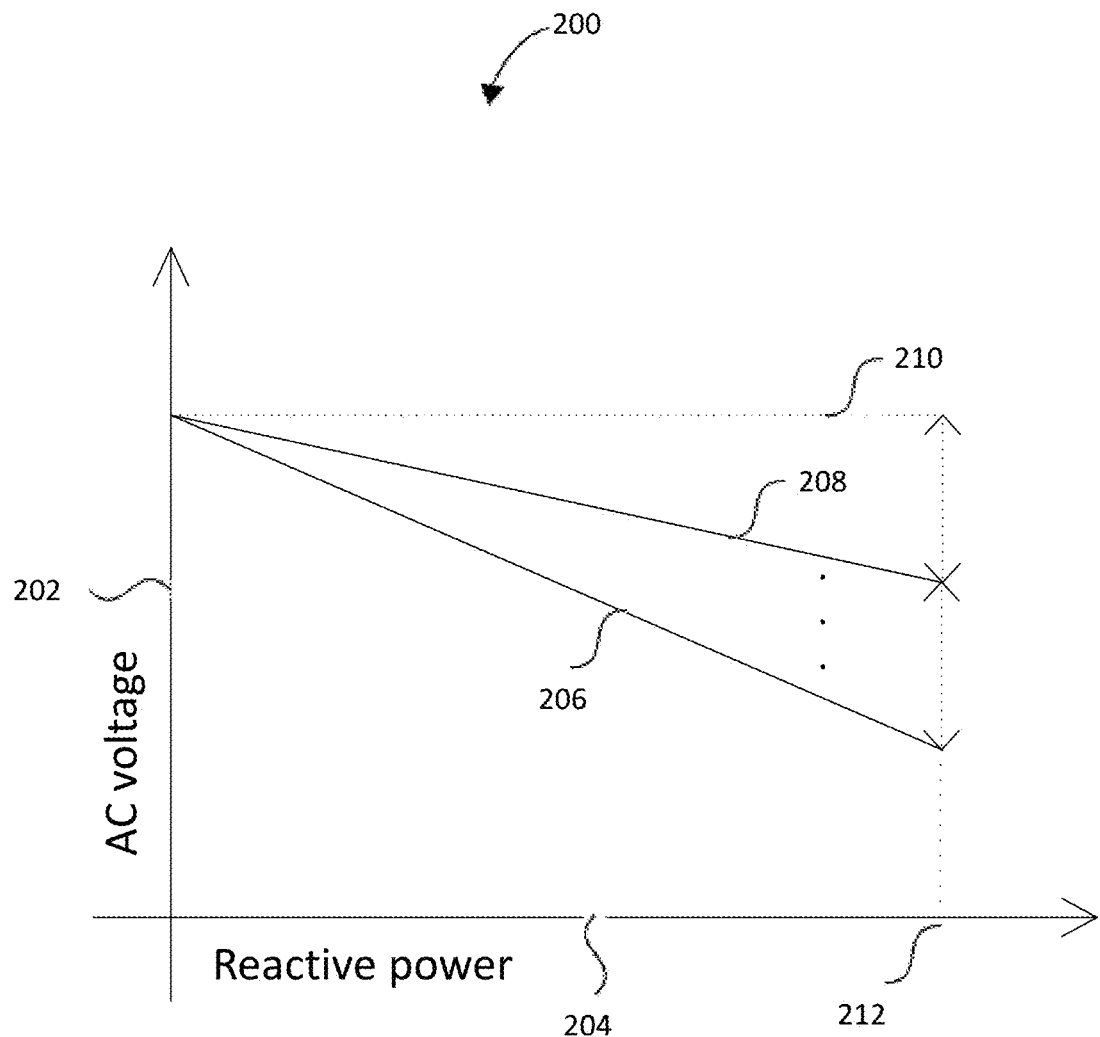
FIG. 2 illustrates a conventional AC voltage—reactive power droop control procedure.

FIG. 2 illustrates a conventional AC voltage-reactive power droop control procedure 200 that may be utilized in association with the electric power system 100. For example, for a given electric power source or device, (e.g. the electric power source or device, 104) the droop control procedure 200 may be characterized by a line 206. The line 206 describes a relationship between the voltage output by the electric power source or device, 104, indicated on the axis 202, and the reactive power drawn by a load connected to the bus 102. The reactive power is indicated on an axis 204. Similarly, the electric power source or device, 106 may be associated with a line 208 that describes the relationship between the voltage outputted by the electric power source or device, 106 and the reactive power drawn by the load.

Each one of the lines 206 and 208 is bounded by a maximum voltage 210 and a maximum reactive power 212, which define the operational range of the particular electric power source or device associated with the line. Further, in the conventional droop control procedure 200, the slope of each one of the lines 206 and 208 is pre-determined and is based on the rated capacity of its associated electric power source or device (i.e., the electric power source or device 104 and the electric power source or device 106, respectively).

Furthermore, the slope of each one of the lines 206 and 208 remains constant throughout the operational range of the associated electric power source or devices once determined. Generally, in the electric power system 100, using a conventional droop control procedure, different electric power source or devices with different rated capacities will have drop control lines having different slopes.

Figure 3:
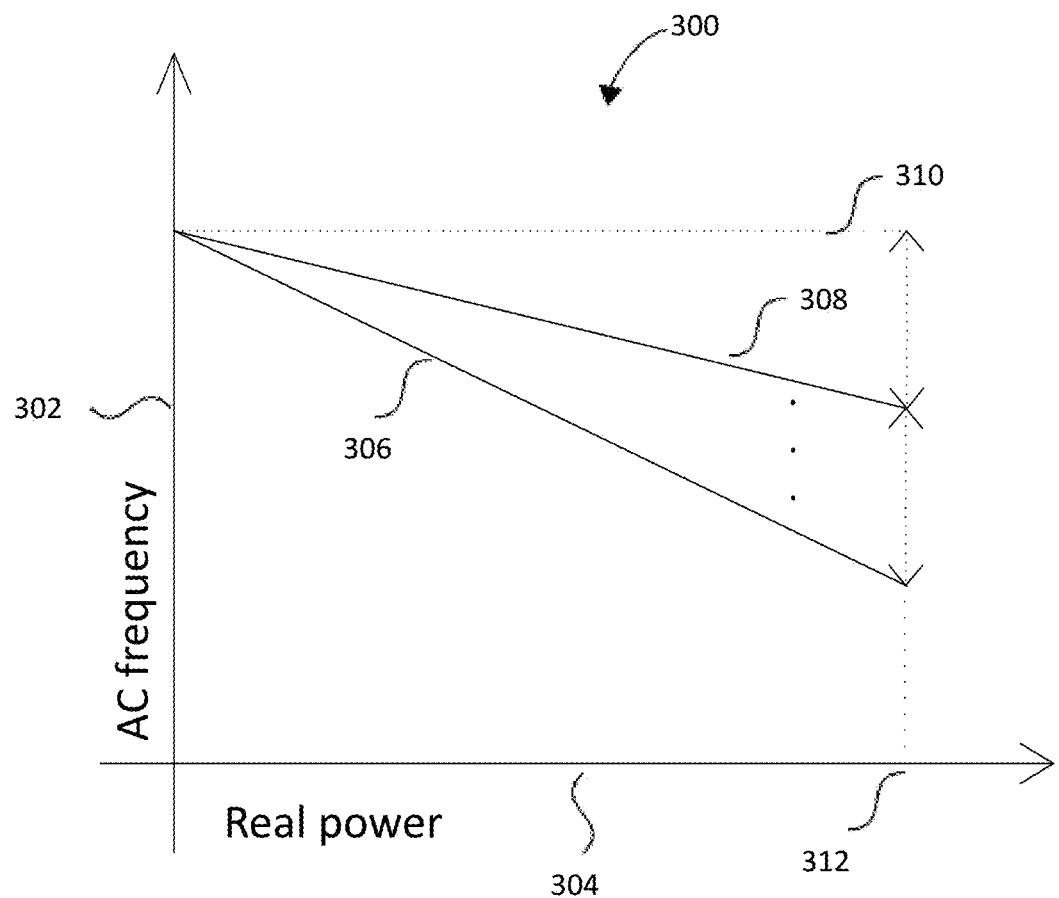
FIG. 3 illustrates a conventional AC frequency—real power droop control procedure.

FIG. 3 illustrates another conventional AC frequency—real power droop control procedure 300 that may be utilized in association with the electric power system 100 in lieu of the conventional droop control procedure 200. For a given electric power source or device, (e.g. the electric power source or device 104) the droop control procedure 300 may be characterized by a line 306 that describes a relationship between the frequency of the electric power source or device 104, indicated on the axis 302, and the real power drawn by a load connected to the bus 102 where the real power is indicated on the axis 304.

Similarly, the electric power source or device 106 may be associated with a line 308 that describes the relationship between the frequency of the electric power source or device 106 and the real power drawn by the load. Further, each one of the lines 306 and 308 is bounded by a maximum frequency 310 and a maximum real power 312. Furthermore, each one of the lines 306 and 308 has a constant slope that is pre-determined based on its associated electric power source or device's rated capacity.

While the above-mentioned droop control procedures work well in coordinating and maintaining the stability of the bus 102 in the electric power system 100, these procedures do not work well with other power systems. Particularly, they do not work well with power systems that include increasingly popular energy storage modules or systems that may be connected to the bus 102 to function as additional generation sources. Specifically, the droop control procedures 200 or 300 would not ensure voltage or frequency stability (respectively) on the bus 102 because energy storage modules or systems have variable capacity. For example, the energy storage modules have changing state of charge as the energy storage modules are being charged or discharged.

Figure 4:
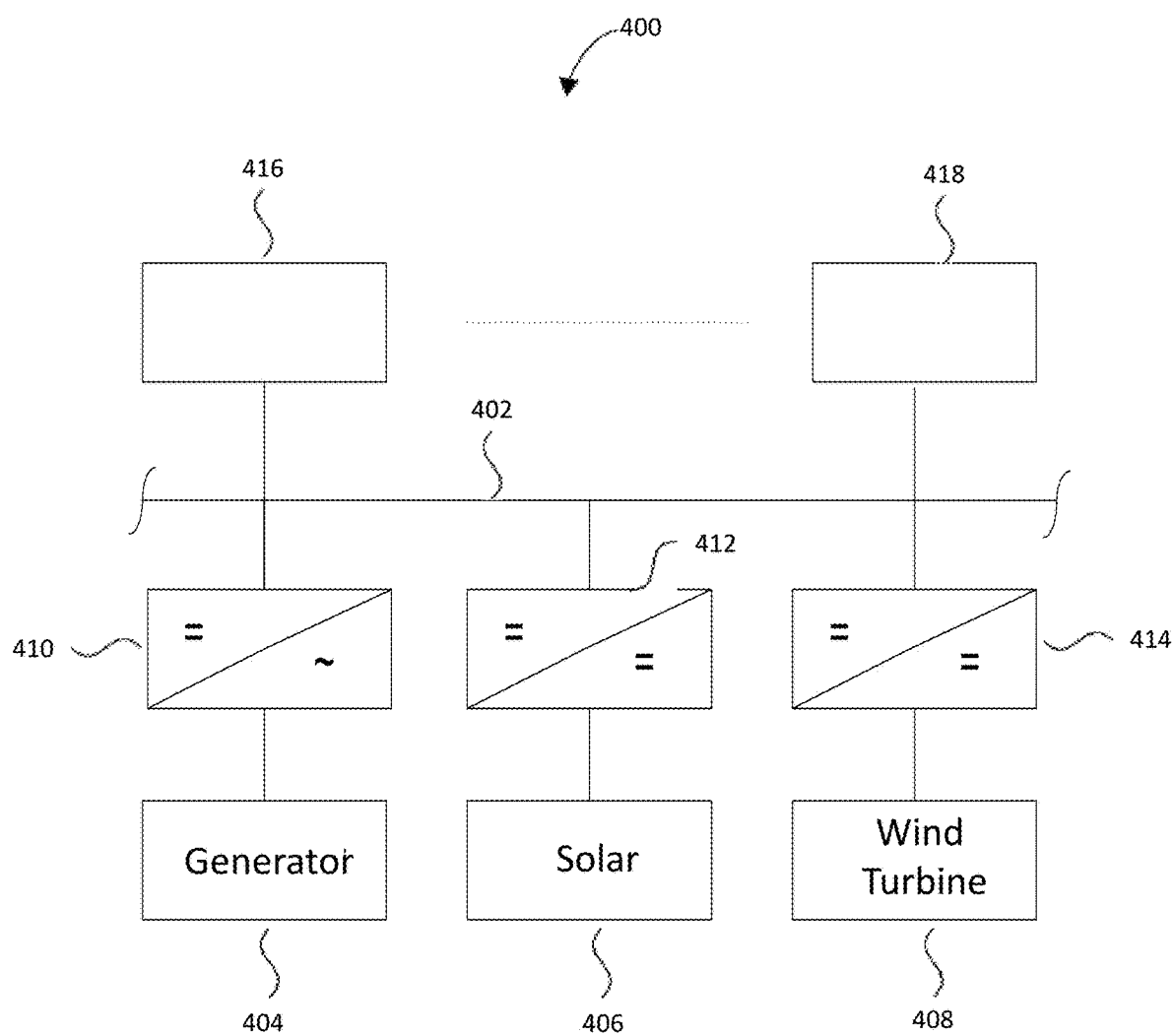
FIG. 4 illustrates a section of a conventional DC electric power distribution system with multiple generation resources.

FIG. 4 illustrates an electric power system 400 in which conventional droop control procedures are inadequate. The electric power system 400 is a direct current (DC) electric power system. It includes a DC distribution bus 402 for which a generator 404, solar panels 406, and a wind turbine 408 may each serve as an energy source. The electric power system 400 further includes a set of energy storage modules of which an energy storage module 416 and an energy storage module 418 are shown.

Furthermore, between the DC distribution bus 402 and the power sources or devices, the electric power system 400 includes power converters that convert the power generated from the afore-mentioned sources to a power level or a power regime suitable for the DC distribution bus 402. For example, an AC to DC converter 410, a DC to DC converter 412, and a DC to DC converter 414 are placed between the generator 404, solar panels 406, and wind turbine 408 respectively and the DC distribution bus 402.

Figure 5:
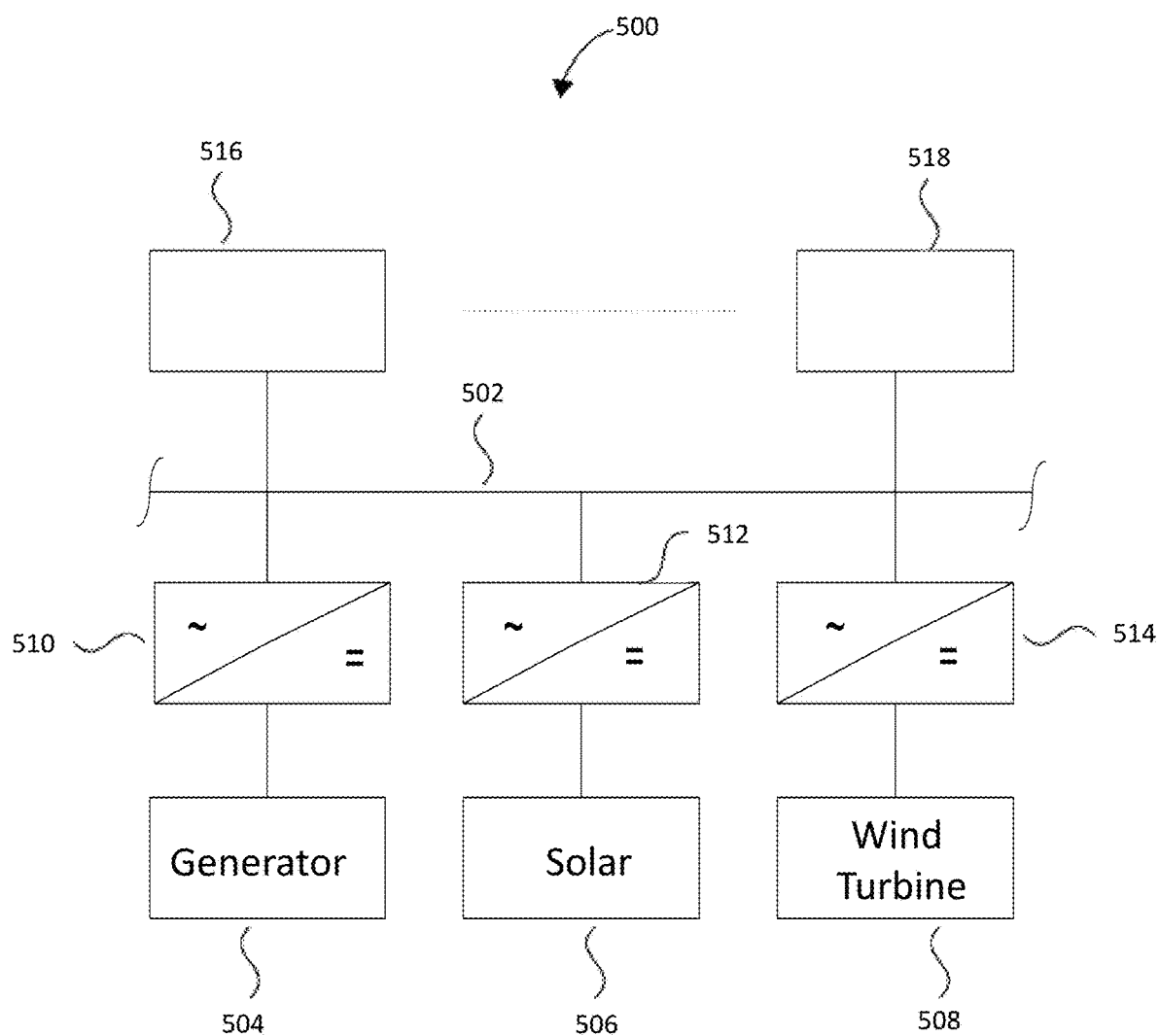
FIG. 5 illustrates a section of a conventional AC electric power distribution system with multiple generation resources.

FIG. 5 illustrates yet another electric power system 500 in which conventional droop control procedures are inadequate. The electric power system 500 is an AC electric power system. It includes an AC distribution bus 502 for which an energy storage module 504, solar panels 506, a wind turbine 508, a generator 516, and a generator 518 may each serve as an energy or power source.

Furthermore, between the AC distribution bus 502, there are disposed power converters that convert the power generated from some of the afore-mentioned sources to a power level or a power regime that is suitable for the AC distribution bus 502. For example, a DC to AC converter 510 is placed between the AC distribution bus 502 and the energy storage module 504. A DC to AC converter 512 is placed between the solar panels 506 and the AC distribution bus 502. And an AC to AC converter 514 is placed between the wind turbine 508 and the AC distribution bus 502.

Figure 6:
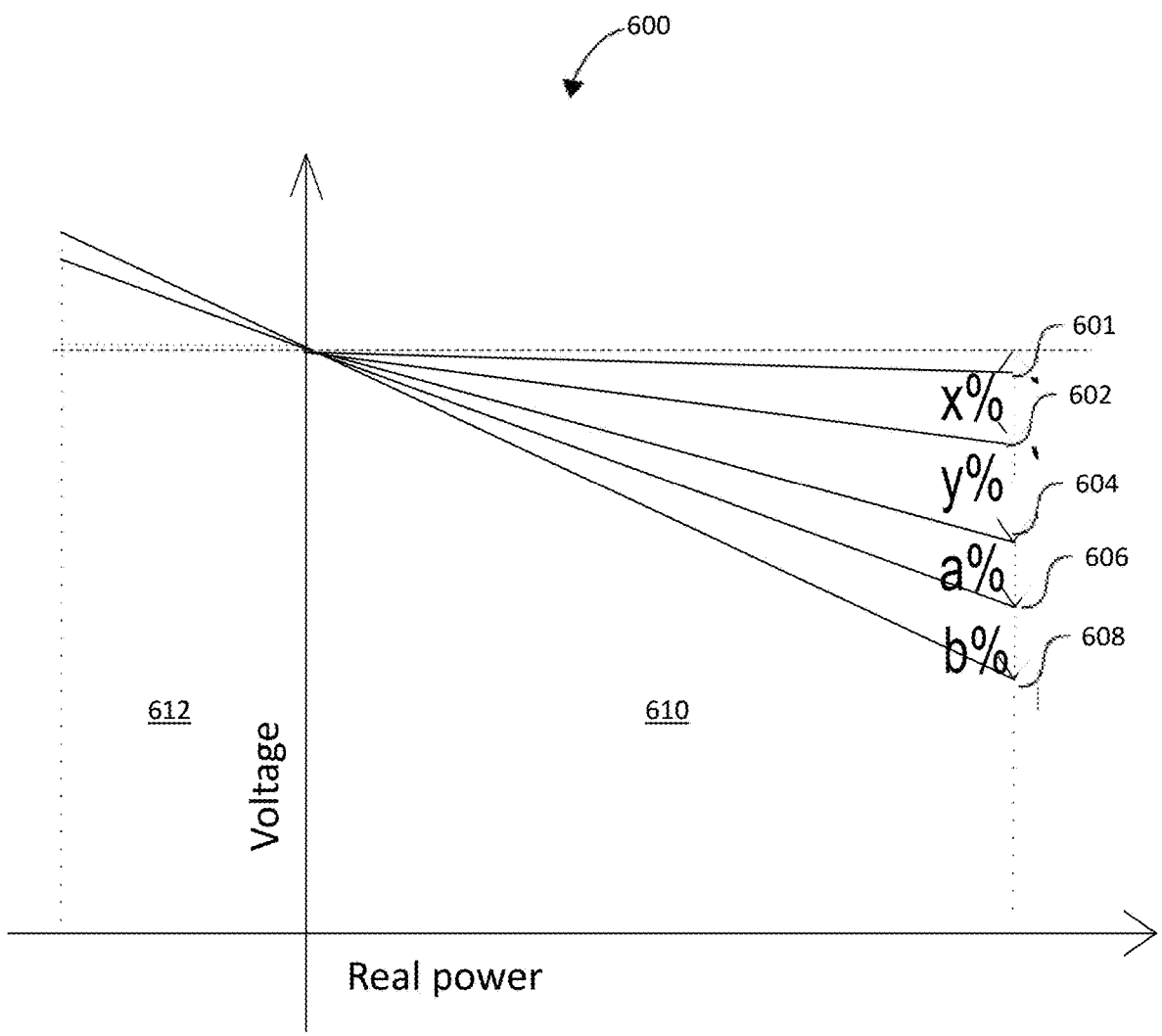
FIG. 6 illustrates a droop control procedure in accordance with several aspects described herein.
Figure 7:
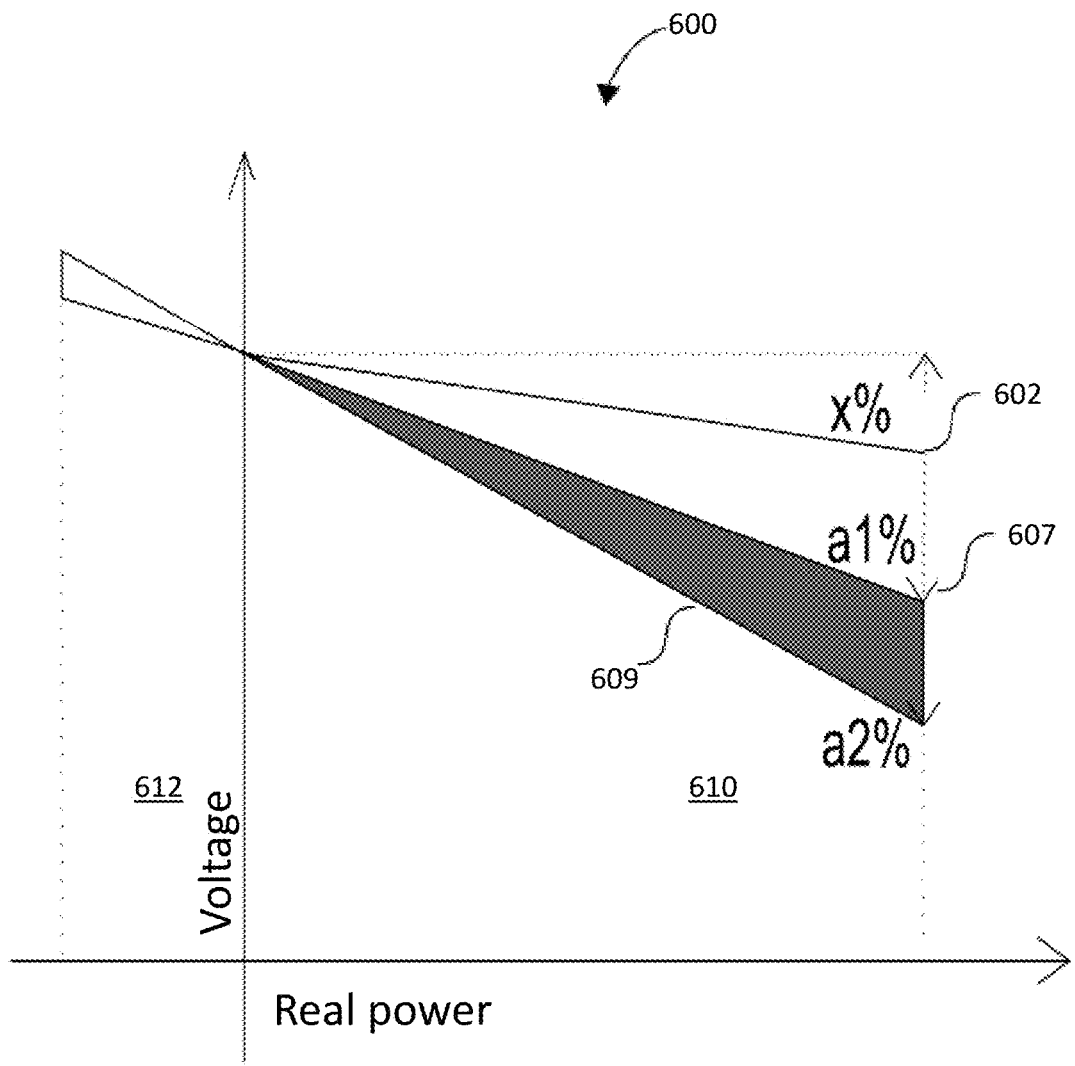
FIG. 7 illustrates a droop control procedure in accordance with several aspects described herein.
Figure 8:
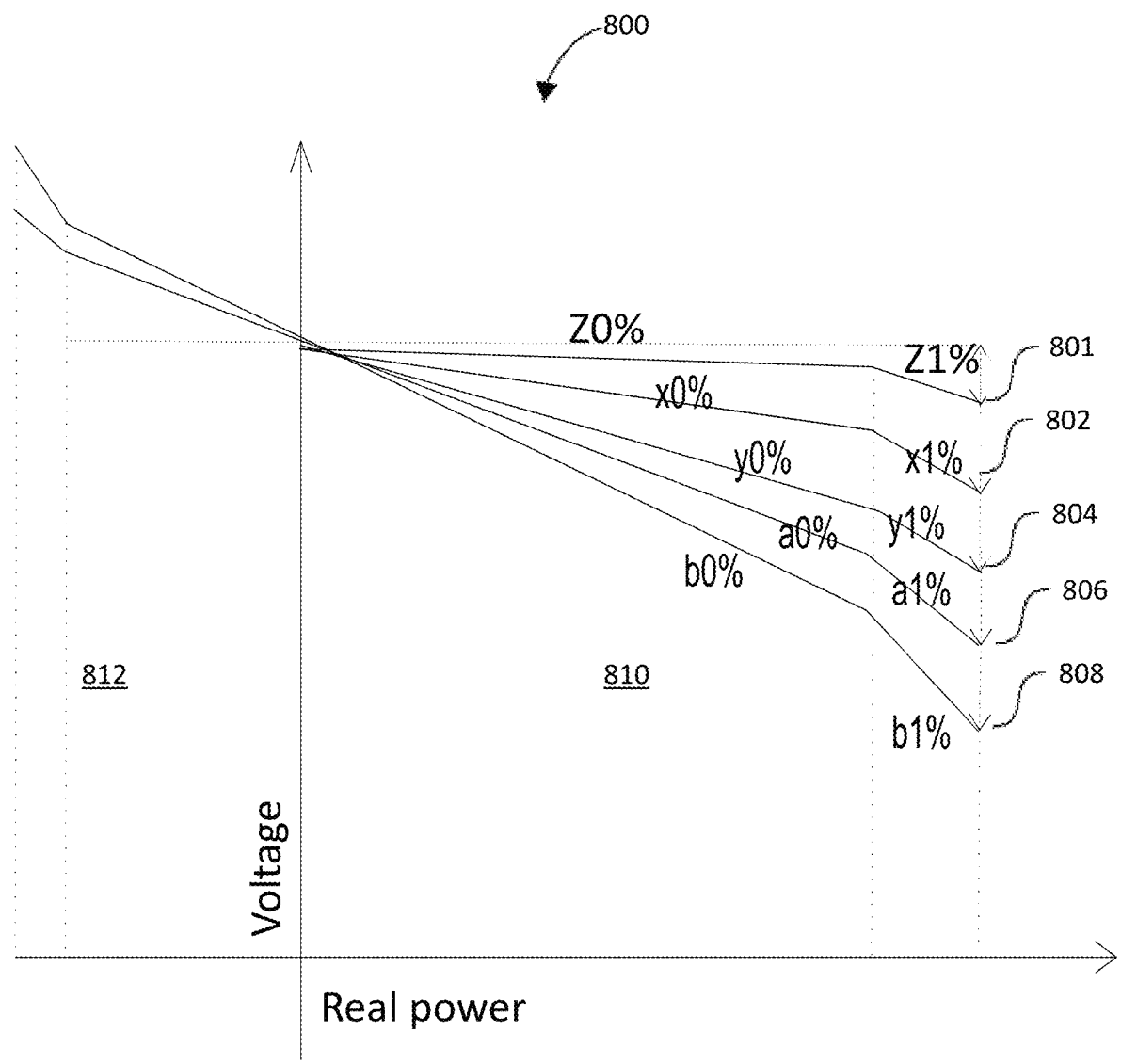
FIG. 8 illustrates a droop control procedure in accordance with several aspects described herein.

FIGS. 6, 7, and 8 illustrate droop control procedures that are adequate for the electric power system 400, according to an embodiment. Considering FIG. 6 and in relation with the electric power system 400 of FIG. 4, there is shown a droop control procedure 600 for the energy storage and generation assets. For a rotating generation asset, such as the generator 404, the slope of the droop control line 602 (denoted x %) is pre-determined based on the rated (constant) capacity of the generator 404. The slope is constant throughout the operational range of the asset.

Similarly, the droop control line 604 of another generator of the electric power system 400 may have a constant slope (denoted y %) throughout the operational range. The droop control line 601 is associated with the solar panels 406. Moreover, in the droop control procedure 600, the region 610 is associated with power generation from the plurality of sources tied to the bus 402. The region 612 is associated with charging the energy storage modules 416 and 418.

In contrast, the slopes (denoted a % and b %) of the droop control lines 606 and 608 associated with the energy storage module 416 or 418, respectively, will be variable and will depend on the capacity of each energy storage module. For example, because the capacity of the energy storage module 416 will be a variable, the slope of the droop control line 606 will also be changed accordingly based on, for instance, the state of charge (SOC), the energy and power, the temperature, or the state of health (SOH) of the energy storage module 416, according to Equation 1.

$$\text{Slope}=f(\text{SOC},\text{Power},\text{Energy},\text{Temperature},\text{SOH}) \qquad (1)$$

One of skill in the art will recognize that the slope of the droop control line for energy storage module 416 or 418 may depend on one or more, or on all of the aforementioned parameters. Additionally, in some implementations, the slope may depend on other parameters such as the lifetime (as characterized by capacity loss and internal resistance growth) of the battery. Specifically, irrespective of the load, the state of charge of the battery may vary as a function of its usage and or lifetime. As such, the capacity of an energy storage module changes as a function of lifetime and or usage. Accordingly, these features may be considered in determining the non-constant slope.

Further, in the droop control procedure 600, non-dispatchable renewable sources (solar or wind) are placed to be the first ones to be deployed or to be engaged in providing power to loads. The rotating electrical machines (i.e. the generators), which are dispatchable sources, are scheduled next, and the energy storage modules 416 and 418 are the last to be scheduled based on their rated capacity and state of charge. This prioritizing order is indicated by the relative absolute value increase in slope for each asset in FIG. 6.

As shown in the example FIG. 7, the droop control procedure 600 may include a droop control range delimited by two distinct droop control curves (607 and 609) to account for the variable slope of the energy storage module 416. As such, a droop controller may be configured to regulate a power delivery from the energy storage module 416 to the bus 402. This regulation is accomplished with a droop control curve situated within the droop control range or with either one of the droop control curves 607 and 609. The droop control curves 607 and 609 provide for the maximum state of charge achievable, and the minimum state of charge achievable, respectively. The slopes for each of these states are denoted as a1% and a2% respectively.

The droop control procedure 600 may be a frequency versus real power droop control procedure or a voltage versus reactive power droop control procedure for AC power systems. The droop control procedure 600 can also be any other type of droop control procedure known in the art, such as a voltage versus real power droop control procedure for DC power systems. As such, depending on the type of droop control procedure used, the droop control procedure 600 may also be appropriate for the electric power system 500, which utilizes an AC distribution bus (i.e., the bus 502). In yet other embodiments, the droop control procedure 600 may be applied to the DC system 400.

FIG. 8 illustrates yet another embodiment of how droop control may be achieved for electric power systems that include energy storage modules. In the droop control procedure 800, each drop control line may have a non-constant slope across the range of operation. For example, the droop control procedure 800 includes piece-wise linear droop control lines for multiple generation assets having finite and limited capacities. The different slopes are determined based on the loads, the finite and limited capacity of the energy storage modules and the operating characteristics. For example, in one use case, at near or full load, the slopes of the droop lines can be changed to be steeper droop lines.

The droop control procedure 800 includes a droop control line 801 for the solar panels 406, droop control lines 802 and 804 which may be associated with generators, and droop control lines 806 and 808, which are associated with energy storage modules 416 and 418. Each droop control line has a non-constant slope as noted above. For example, lines 802 and 804 are piece-wise linear.

For example, the line 802 may have a first slope x0% and a second slope x1%. The line 804 may have a first slope y0% and a second slope y1%. Similarly, the line 801 has two different slopes (z0% and z1%). The line 806 may have a first slope a0% and a second slope a1%, and the line 808 may have a first slope b0% and a second slope b1%. Moreover, in the droop control procedure 800, the region 810 is associated with power generation from the plurality of sources tied to the bus 402 whereas the region 812 is associated with charging the energy storage modules 416 and 418.

Figure 9:
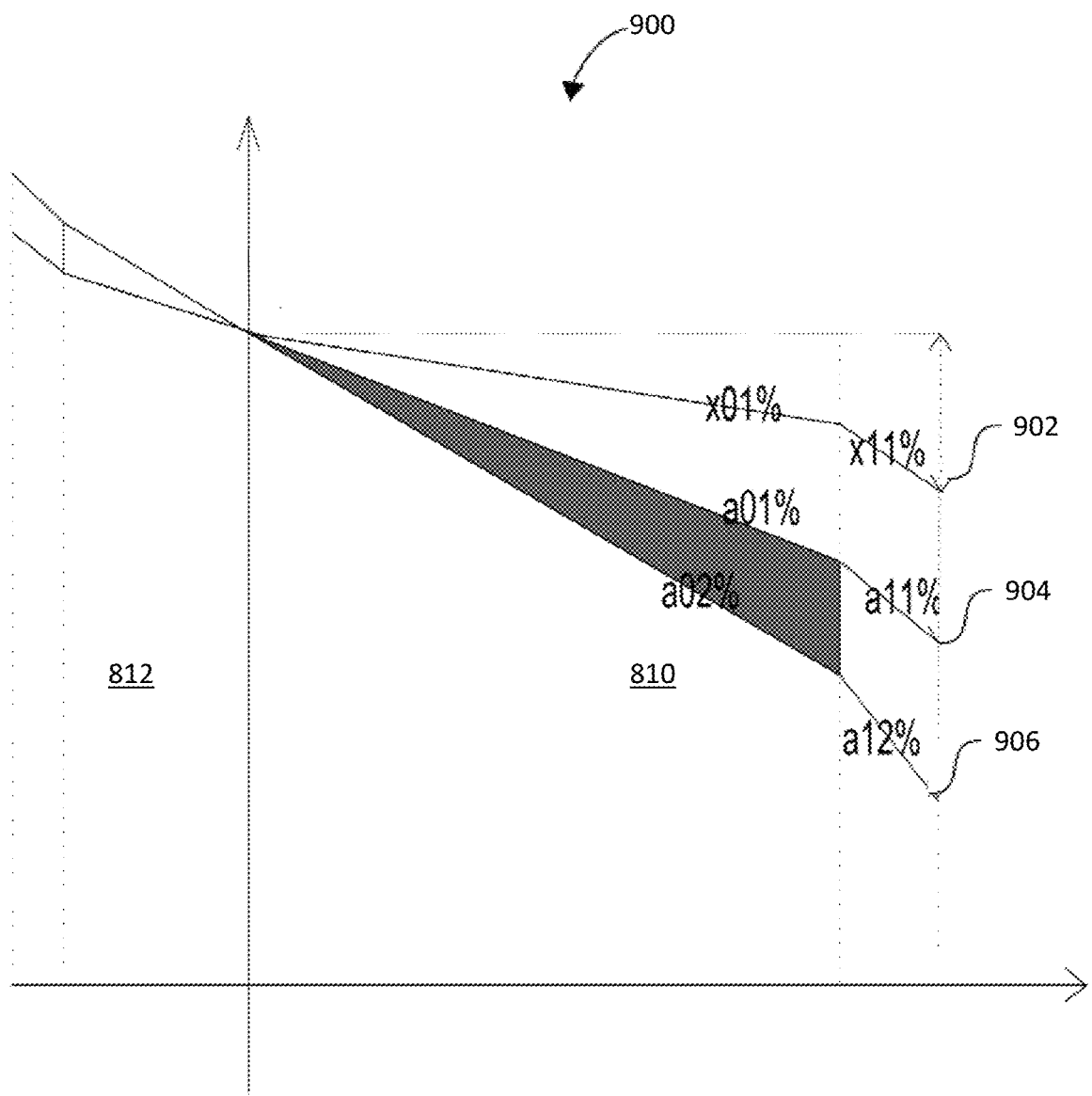
FIG. 9 illustrates a droop control procedure in accordance with several aspects described herein.

FIG. 9 illustrates yet another embodiment of how droop control may be achieved for electric power systems that include energy storage modules. Each droop control line of the procedure may have a non-constant slope. The droop control procedure 900 may include a droop control line 902 associated with a generator of the electric power system.

In FIG. 9, the slopes x01% and x11% may be determined as discussed above with respect to FIG. 8. To account for the variable capacity of the energy storage module, the droop control procedure 900 may include a droop control range delimited by two distinct droop control lines (904 and 906). Further, each droop control line in the range (inclusive of the lines 904 and 906) may have a non-constant slope as discussed above with respect to FIG. 8.

As a result, a droop controller may be configured to regulate a power delivery from the energy storage module 416 to the bus 402 with a droop control curve situated within the droop control range or with either one of the droop control curves 904 and 906, for a case of the maximum state of charge achievable and the minimum state of charge achievable, respectively.

The piece-wise linear line 904 has slopes a01% and a11% whereas the piece-wise linear line 906 has slopes a02% and a12%. Again, based on which distribution bus is used (i.e., AC vs DC), the droop control procedure 900 may be used with the electric power system 500. Specifically, the droop control procedure 900 may be a frequency versus real power droop control procedure that may be used with the AC electric power system 500.

Figure 10:
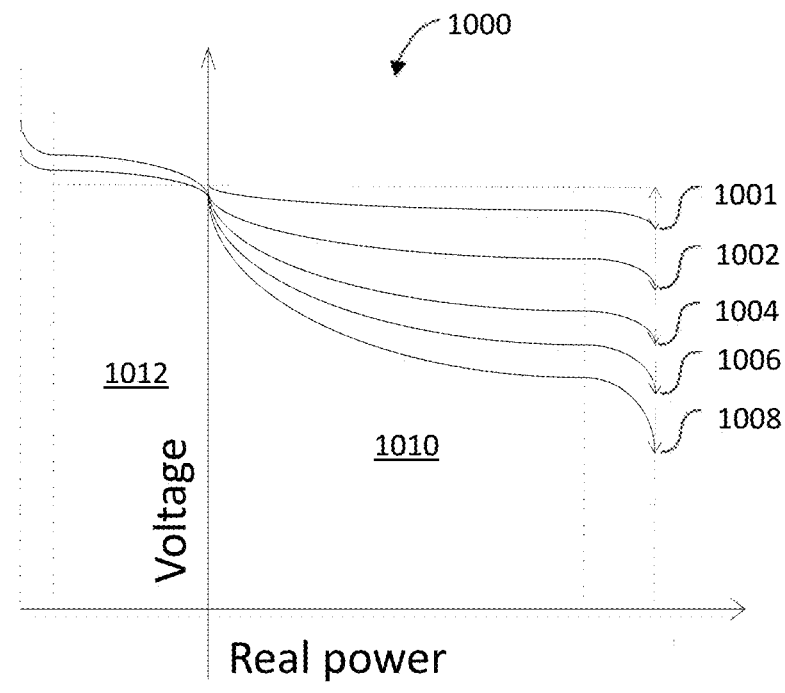
FIG. 10 illustrates two droop control procedures in accordance with several aspects described herein.
Figure 10:
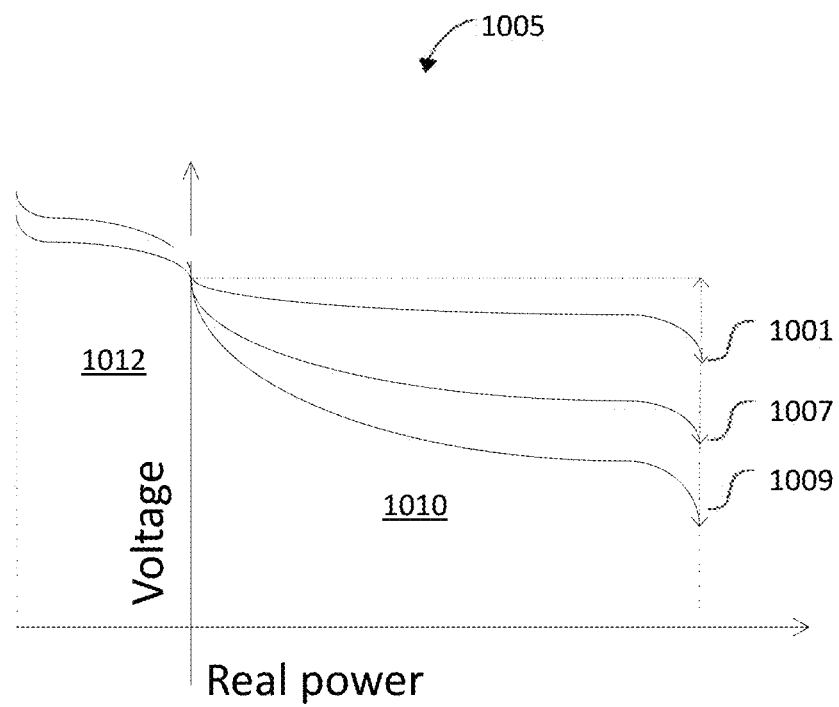

FIG. 10 illustrates yet another embodiment of how droop control may be achieved for electric power systems that include energy storage modules. In the droop control procedure 1000, each drop control line may have a non-constant curvature across the range of operation, but instead of being piece-wise linear, the drop control lines for each asset may have a variable curvature. The droop control lines 1001, 1002, and 1004 may be associated with a solar asset, a first generator, and a second generator, respectively. The lines 1006 and 1008 may each be associated with an energy storage module.

Moreover, in the droop control procedure 1000 the region 1010 is associated with power generation from the plurality of sources tied to the bus 402 whereas the region 1012 is associated with charging the energy storage modules 416 and 418. When it is a frequency versus real power droop control procedure, the droop control procedure 1000 may be used with the electric power system 500.

FIG. 10 further illustrates a droop control procedure 1005 that is adapted to account for the variation in the capacity of the energy storage modules. Specifically, the droop control procedure 1005 may include a droop control range delimited by two distinct droop control lines (1007 and 1009). Further, each droop control line in the range (inclusive of the lines 1007 and 1009) may have a variable curvature. Accordingly, a droop controller may be configured to regulate a power delivery from the energy storage module 416 to the bus 402 with a droop control curve situated within the droop control range or with either one of the droop control curves 1007 and 1009, for a case of the maximum state of charge achievable and the minimum state of charge achievable, respectively.

Figure 11:
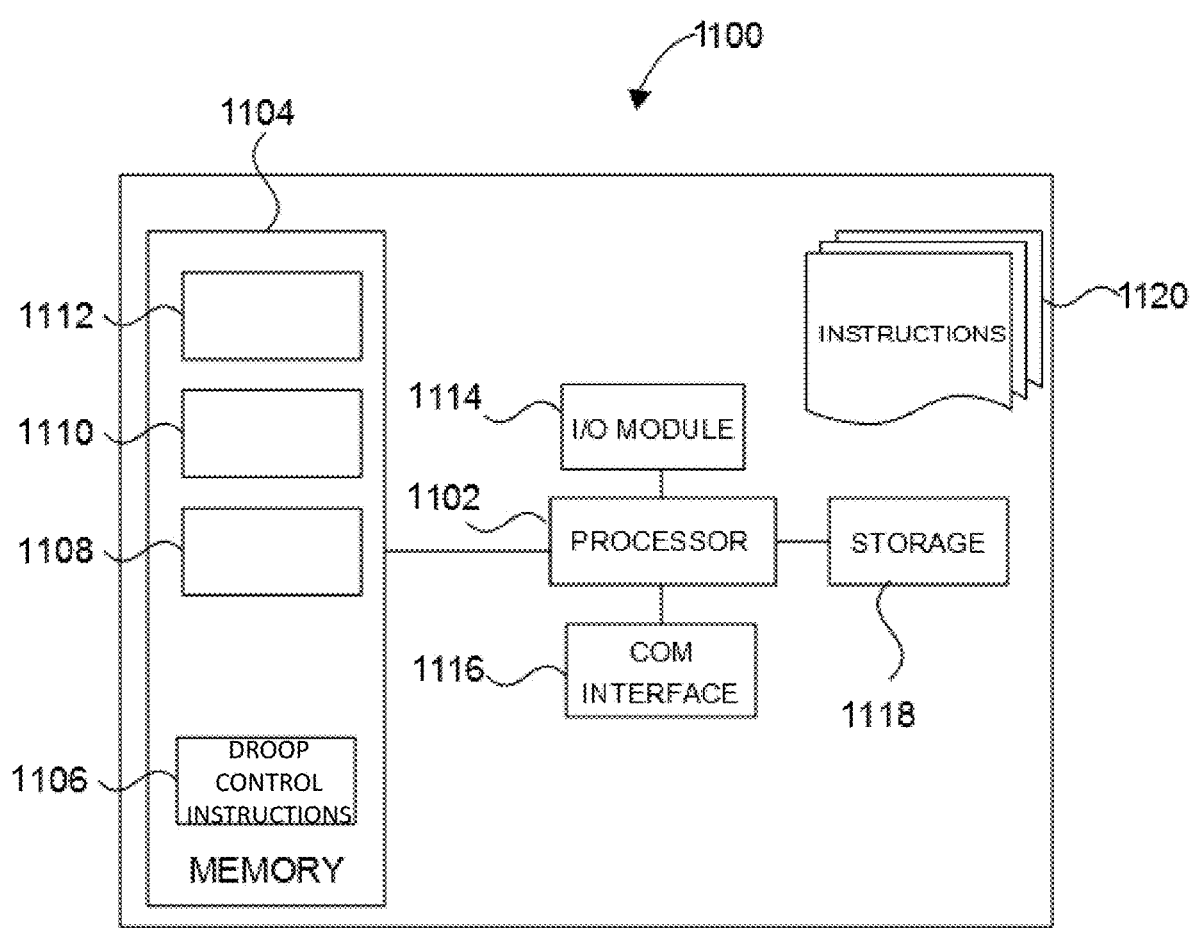
FIG. 11 illustrates a block diagram of a controller in accordance with several aspects described herein.

FIG. 11 shows a block diagram of a controller 1100 that can be used to control one or more energy sources of an electric power system according to the exemplary droop control procedures described above. The controller 1100, which may be a droop controller, may be communicatively coupled to a distribution bus and to the various electric power sources or devices that connect to the distribution bus, such as an electric storage module, a generator, solar panels, and a wind turbine.

As described below, the controller 1100 may include sensors or may be connected to sensors that can measure the output frequency, voltage, and power on the bus for each of the electric power sources or devices including loads connected to the bus. Based on the sensor measurements, the controller 1100 may be configured and adjust the output frequency or voltage in view of the measured power and according to one of the exemplary droop control procedures described above.

The controller 1100 may include a processor 1102 that has a specific structure. The specific structure can be imparted to the processor 1102 by instructions stored in a memory 1104 included in the controller 1100 and or by instructions 1120 that can be fetched by the processor 1102 from a storage medium 1118. The storage medium 1118 may be co-located with the controller 1100 as shown, or it may be located elsewhere and be communicatively coupled to the controller 1100.

The controller 1100 can be a stand-alone programmable system, or it can be a programmable module located in a much larger system. For example, the controller 1100 can be part of a specified electric power source or device tied to the bus, where the specific electric power source or device can thus serve to control the bus and the power source or devices connected thereto. The controller 1100 may include one or more hardware and or software components configured to fetch, decode, execute, store, analyze, distribute, evaluate, and or categorize information. Furthermore, the controller 1100 can include an input or output (I/O) module 1114 that can be configured to interface with a plurality of sensors that report the afore-mentioned measurements to the processor 1102.

The processor 1102 may include one or more processing devices or cores (not shown). In some embodiments, the processor 1102 may be a plurality of processors, each having either one or more cores. The processor 1102 can be configured to execute instructions fetched from the memory 1104, i.e. from one of the memory blocks 1112, 1110, 1108, or the memory block 1106, or the instructions may be fetched from the storage medium 1118, or from a remote device connected to the controller 1100 via a communication interface 1116.

Furthermore, without loss of generality, the storage medium 1118 and or the memory 1104 may include a volatile or non-volatile, magnetic, semiconductor, tape, optical, removable, non-removable, read-only, random-access, or any type of non-transitory computer-readable computer medium. The storage medium 1118 and or the memory 1104 may include programs and or other information that may be used by the processor 1102. Furthermore, the storage medium 1118 may be configured to log data processed, recorded, or collected during the operation of controller 1100. The data may be time-stamped, location-stamped, cataloged, indexed, or organized in a variety of ways consistent with data storage practice.

In one embodiment, for example, the memory block 1106 may include instructions that perform a droop control procedure such as the exemplary droop control procedures described above. Specifically, when executed by the processor 1102, the instructions of the memory block 1106 may cause the processor 1102 to perform certain operations.

The operations may include receiving sensor measurements from an electric power source or device and generating, based on the sensor measurements, a droop control procedure including a droop control range delimited by two distinct droop control curves. The operations may further include instructing the processor to regulate a power delivery from the electric power source or device to a bus to regulate the power delivery according to the droop control procedure.

In another embodiment, the operations may include receiving sensor measurements from an electric power source or device and generating, based on the sensor measurements, a droop control procedure that includes a droop control curve having a non-constant slope or curvature. The operations further include regulating a power delivery from the electric power source or device to a bus according to the droop control procedure.

Figure 12:
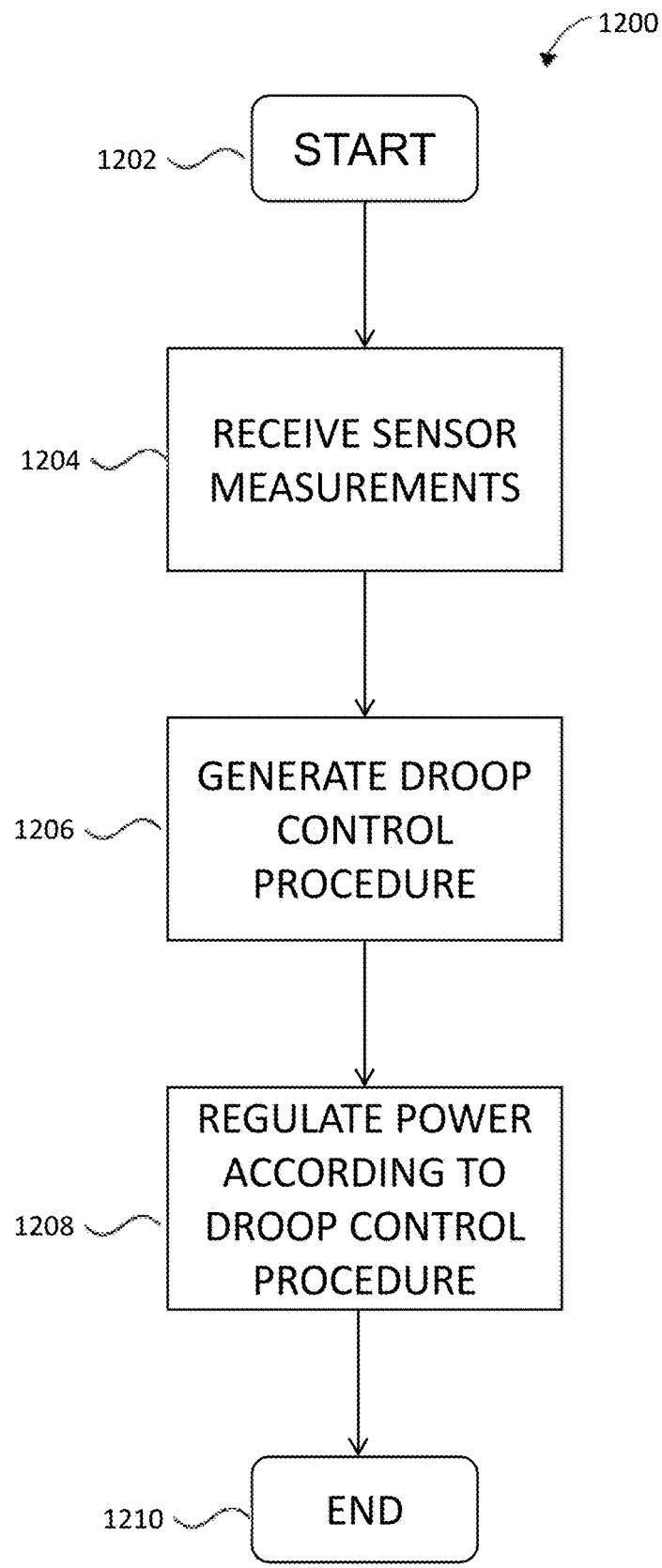
FIG. 12 shows the flow chart of a method for performing droop control in accordance with several aspects described herein.

FIG. 12 illustrates an exemplary method 1200 that may be executed by the controller 1100. The method 1200 begins at step 1202 and it includes receiving at step 1204, by the controller 1100, sensor measurements indicative of a state of an electric power source or device. The method 1200 further includes generating at step 1206, based on the sensor measurements, a droop control procedure including a droop control curve having a non-constant slope or curvature.

The method 1200 further includes regulating, at step 1208, a power delivery from the electric power source or device to a bus according to the droop control procedure. The method 1200 ends at step 1210. Generally, any of the exemplary droop control procedures may be used in the context of method 1200. For example, in another embodiment, the step 1206 may include generating a droop control procedure that includes a droop control range, as previously discussed.

The exemplary embodiments described herein solve the problem of traditional linear droop control when applied to an electric power system with multiple generation assets including energy storage. The embodiments feature non-constant slope droop control lines, which can be piece-wise linear or non-linear, with variable curvature. In the embodiments, the multiple yet different power sources can work together in synchrony and in harmony.

The embodiments enable distributed power generation and controls for power systems containing energy storage, and as such an integrated system performing droop control as described herein can function autonomously or semi-autonomously, i.e., without centralized controls or coordinated decision-making. Furthermore, when centralized controls or communications exist, the exemplary droop controller and or method may serve as a backup in the case of an emergency or as a redundancy measure that allows system operation when and if centralized controls are lost.

Generally, some of the embodiments described herein provide variable slope linear voltage droop control, which enables distributed and autonomous controls of DC power systems with energy storage devices as generation assets. Furthermore, some of the embodiments may herein provide variable slope linear voltage droop control, which enables distributed and autonomous controls of AC power systems with energy storage devices as generation assets.

Moreover, some embodiments feature piece-wise or variable curvature non-linear voltage droop control that enable distributed and autonomous controls of DC power systems with energy storage devices as generation assets. Other embodiments feature piece-wise and variable curvature non-linear frequency droop control that enable distributed and autonomous controls of AC power systems with energy storage devices as generation assets.

The embodiments provide flexibility for performance optimization and they allow better load sharing at near or full loads. Furthermore, they allow the managing of power, energy, and loads based on energy storage available capacity. They can operate independently and autonomously, which enhances reliability.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, comprising:
    a hardware processor;
    a memory including instructions that, when executed by the hardware processor, cause the hardware processor to perform operations including:
    receiving, from an electric power system which comprises a plurality of different types of power source devices delivering power to a common power bus, sensor measurements from the plurality of electric power source devices, wherein the plurality of power source devices includes an energy storage element and at least one element which is either a dispatchable power source or non-dispatchable renewable power source;
    determining a plurality of droop control curves for the plurality of power sources or devices, each respective power source or device of the plurality having a respective droop control curve, wherein:
        each respective droop control curve has a power source-specific slope, and
        the power source-specific slope for the energy storage element is generated in accordance with the received sensor measurements;
    generating for the electric power system an integrated droop control procedure based on the plurality of droop control curves; and
    regulating a power delivery from the plurality of electric power sources or devices to the common bus according to the integrated droop control procedure for the multiple of different types of power sources.

2. The system of claim 1, wherein the respective droop control curve for the energy storage element is a variable function of a capacity of the energy storage element in accordance with the received sensor measurements.

3. The system of claim 2, wherein the respective droop control curve for the energy storage element is a line which may be piece-wise linear or non-linear with variable curvature.

4. The system of claim 3, wherein the line which may be piece-wise linear or non-linear with variable curvature depends on at least one of a state of charge of the energy storage element, a state of health of the energy storage element, a power measurement of the energy storage element, a temperature of the energy storage element, and a measure of prior usage of the energy storage element.

5. The system of claim 3, wherein the integrated droop control procedure further includes another droop control curve for the energy storage element, the another droop control curve delimiting a droop control range for the energy storage element.

6. The system of claim 1, wherein the plurality of electric power source devices includes a generator, the generator having an associated droop control curve which is predetermined based on a constant rated capacity of the generator.

7. The system of claim 1, wherein the droop control procedure is based on either a frequency versus reactive power droop control procedure or a voltage versus real power.

8. The system of claim 3, wherein the operations further include generating, based on other sensor measurements associated with another electric power source device which is other than the energy storage element and is either of:
    the at least one element which is either a dispatchable power source or non-dispatchable renewable power source, or
    a second energy storage element,
    another droop control procedure including another droop control curve having a line which may be piece-wise linear or non-linear with variable curvature.

9. The system of claim 1, wherein the hardware processor is further configured to generate the integrated droop control procedure to prioritize a provision of power from among the plurality of power source devices according to a comparison of relative absolute values in slopes among the plurality of respective droop control curves.

10. A system, comprising:
    a hardware processor;
    a memory including instructions that, when executed by the hardware processor, cause the hardware processor to perform operations including:
    receiving sensor measurements from a single energy storage module;
    generating, based on the sensor measurements, a droop control procedure for the single energy storage module including a droop control range delimited by two distinct droop control curves which provide for a maximum state of charge achievable, and a minimum state of charge achievable; and
    regulating a power delivery from the energy storage module to a bus according to the two distinct control curves of the droop control procedure.

11. The system of claim 10, wherein at least one of the two distinct droop control curves has a non-constant slope.

12. The system of claim 11, wherein at least one of the two distinct droop control curves is a piece-wise linear curve.

13. The system of claim 11, wherein at least one of the two distinct droop control curves has a variable curvature.

14. The system of claim 10, wherein the electric power source or device is an energy storage element.

15. The system of claim 14, wherein the droop control range depends on at least one of a state of charge of the energy storage element and a state of health of the energy storage element.

16. A method, comprising:

receiving, by a hardware processor coupled to an electric power system which comprises a plurality of different types of power source devices delivering power to a common power bus, sensor measurements indicative of a plurality of respective states of the plurality of different types of electric power source devices, wherein the plurality of power source devices includes an energy storage element and at least one element which is either a dispatchable power source or non-dispatchable renewable power source;

determining a plurality of droop control curves for the plurality of power sources, each respective power source of the plurality having a respective droop control curve, wherein:

each respective droop control curve has a power source-specific line which may be piece-wise linear or non-linear with variable curvature, and the power source-specific slope for the energy storage element is generated in accordance with the received sensor measurements;

generating for the electric power system an integrated droop control procedure based on the plurality of droop control curves; and regulating a power delivery from the plurality of electric power source devices to the common bus according to the integrated droop control procedure for the multiple of different types of power sources.

17. The method of claim 16, wherein the respective droop control curve for the energy storage element is a variable function of a capacity of the energy storage element in accordance with the received sensor measurements.

18. The method of claim 16, wherein;

the respective droop control curve for the energy storage element depends on at least one of a state of charge of the energy storage element, a state of health of the energy storage element, a power measurement of the energy storage element, a temperature of the energy storage element, and a measure of prior usage of the energy storage element.

19. The method of claim 16, wherein the droop control procedure is based on either a frequency versus reactive power droop control procedure or a voltage versus real power.

20. The method of claim 16, further comprising prioritize a provision of power from among the plurality of power source devices according to a comparison of relative absolute values in slopes among the plurality of respective droop control curves.

* * * * *